(12) United States Patent
Cayeux

(10) Patent No.: US 12,139,982 B2
(45) Date of Patent: Nov. 12, 2024

(54) DETERMINING PROPERTIES OF WELLBORE FLUID SYSTEMS

(71) Applicant: Norce Innovation AS, Stavanger (NO)

(72) Inventor: Eric Cayeux, Sandnes (NO)

(73) Assignee: Norce Innovation AS, Stavanger (NO)

( * ) Notice: Subject to any disclaimer, the term of this patent is extended or adjusted under 35 U.S.C. 154(b) by 0 days.

(21) Appl. No.: 18/547,536

(22) PCT Filed: Feb. 25, 2022

(86) PCT No.: PCT/NO2022/050053
§ 371 (c)(1),
(2) Date: Aug. 23, 2023

(87) PCT Pub. No.: WO2022/182249
PCT Pub. Date: Sep. 1, 2022

(65) Prior Publication Data
US 2024/0183232 A1      Jun. 6, 2024

(30) Foreign Application Priority Data
Feb. 26, 2021   (NO) .................................... 20210267

(51) Int. Cl.
*E21B 21/08*      (2006.01)
(52) U.S. Cl.
CPC .................................... *E21B 21/08* (2013.01)
(58) Field of Classification Search
CPC ............... E21B 21/08; E21B 2200/20; G01N 2291/02818; G01N 9/24; G01N 9/36; G01N 29/024; G01N 29/227; G01N 29/228
See application file for complete search history.

(56) References Cited

U.S. PATENT DOCUMENTS

| | | | |
|---|---|---|---|
| 4,208,906 A | * | 6/1980 | Roberts, Jr. ........... E21B 47/107 |
| | | | 702/9 |
| 5,361,632 A | | 11/1994 | Magnani |
| 10,738,551 B1 | | 8/2020 | Smith et al. |
| 2004/0112595 A1 | | 6/2004 | Bostick et al. |

(Continued)

FOREIGN PATENT DOCUMENTS

| | | |
|---|---|---|
| CN | 108240948 | 7/2018 |
| EP | 3348968 | 7/2018 |

(Continued)

OTHER PUBLICATIONS

API, "API RP 13D: Recommended Practice for Rheology and Hydraulics of Oil-well Drilling Fluids," American Petroleum Institute, 2017.

(Continued)

*Primary Examiner* — Steven A MacDonald
(74) *Attorney, Agent, or Firm* — Andrus Intellectual Property Law, LLP

(57) ABSTRACT

Methods and an apparatuses are for determining at least one property of a wellbore fluid system. A measurement apparatus having one or more pipe sections is provided, a drilling fluid is communicated through the pipe section, at least one density which is associated with at least one condition of pressure and temperature of the drilling fluid in the pipe section is measured, and the density of the drilling fluid is measured to determine the property of the wellbore fluid system.

17 Claims, 6 Drawing Sheets

(56) References Cited

U.S. PATENT DOCUMENTS

| | | | |
|---|---|---|---|
| 2008/0314644 A1* | 12/2008 | Cayeux | E21B 7/208 175/215 |
| 2011/0185795 A1 | 8/2011 | Colquhoun | |
| 2012/0059521 A1* | 3/2012 | Iversen | E21B 44/00 700/275 |
| 2012/0072128 A1 | 3/2012 | Gao | |
| 2013/0332125 A1* | 12/2013 | Suter | G01V 99/00 703/6 |
| 2014/0174826 A1* | 6/2014 | Cayeux | E21B 47/14 175/45 |
| 2014/0246243 A1* | 9/2014 | Cayeux | E21B 43/121 175/217 |
| 2015/0160056 A1 | 6/2015 | Schollenberger et al. | |
| 2016/0146653 A1 | 5/2016 | Skelding | |
| 2019/0178770 A1 | 6/2019 | Marum et al. | |
| 2020/0208515 A1* | 7/2020 | Swett | G01N 29/024 |
| 2020/0225381 A1* | 7/2020 | Walles | G01V 1/50 |
| 2020/0386066 A1 | 12/2020 | Brana et al. | |
| 2023/0125603 A1* | 4/2023 | Cayeux | E21B 47/10 73/861.75 |
| 2023/0349801 A1* | 11/2023 | Cayeux | G01N 11/08 |
| 2024/0150187 A1* | 5/2024 | Cayeux | B01J 23/745 |
| 2024/0183232 A1* | 6/2024 | Cayeux | G01N 29/024 |

FOREIGN PATENT DOCUMENTS

| | | |
|---|---|---|
| WO | 2014021884 | 2/2014 |
| WO | 2016054628 | 4/2016 |
| WO | 2021172999 | 9/2021 |

OTHER PUBLICATIONS

Barletta, A. 1997. Fully developed laminar forced convection in circular ducts for power-law fluids with viscous dissipation. Int. J. Heat Mass Transfer, 40 (1): 15-26. https://doi.org/10.1016/S0017-9310(96)00094-4.

Cayeux, E., Mesagan, T., Tanripada, S., Zidan, M., Fjelde, K.K., 2014. Real-time Evaluation of Hole Cleaning Conditions Using a Transient Cuttings Transport Model. SPE Drilling & Completion, 29 (1): 5-21. SPE-163492-PA. https://doi.org/10.2118/166801-PA.

Cayeux, E. (2020). Mathematical Modelling of the Drilling Process for Real-time Applications in Drilling Simulation, Interpretation and Assistance. Doctoral thesis 506, University of Stavanger. ISBN 978-82-7644-913-6.

Crank, J., Nicolson, P., 1947. A practical method for numerical evaluation of solutions of partial differential equations of the heat conduction type. Proc. Cam. Phil. Soc., 43 (1): 50-67. Doi:10.1017/S0305004100023197.

Corre, B., Eymard, R., Guenot, A., 1984. Numerical Computation of Temperature Distribution in a Wellbore While Drilling. Paper SPE-13208-MS presented at the SPE Annual Technical Conference in Houston, Texas, USA, Sep 16-19. https://doi.org/10.2118/13208-MS.

Isambourg, P., Bertin, D., Brangetto, M., 1999. Field Hydraulic Tests Improve HPHT Drilling Safety and Performance. Paper SPE-49115-MS presented at the SPE Annual Technical Conference, New Orleans, Louisiana, USA, Sep. 27-30. https://doi.org/10.2118/49115-MS.

Kemp, N.P., Thomas, D.C., Atkinson G., Atkinson, B. 1989. Density Modelling of Brines as a Function of Composition Pressure and Temperature. SPE Production Engineering, 4 (4): 394-400. SPE-16079-PA. https://doi.org/10.2118/16079-PA.

Landau, L.D., Lifshitz, E.M., 1980. Course of Theoretical Physics, vol. 5, Statistical Physics. Butterworth Heinemann, Elsevier, ISBN 78-0-7506-3372-7.

Press, W.H., Teukolsky, S.A., Vetterling, W.T., Flannery, B.P., 1995. Numerical Recipes in C. Cambridge University Press, ISBN 0 521 43108 5.

Zamora, M., Roy, S., Slater, K., Troncoso, J., 2013. Study on the Volumetric Behavior of Base Oils, Brines, and Drilling Fluids Under Extreme Temperatures and Pressures. SPE Drilling & Completion, 28 (3): 278-288. https://doi.org/10.2118/160029-PA.

International Search Report and the Written Opinion for PCT/NO2022/050053, dated Jun. 14, 2023.

Response to the Written Opinion for PCT/NO2022/050053, dated Nov. 28, 2022.

The Second Written Opinion for PCT/NO2022/050053, dated Dec. 22, 2022.

Response to the Second Written Opinion for PCT/NO2022/050053, dated Feb. 20, 2023.

Norwegian Search Report for Corresponding Norwegian Patent Application No. 20210267, dated Sep. 23, 2021.

International Preliminary Report on Patentability for for PCT/NO2022/050053, dated Mar. 21, 2023.

Cayeux, E. SPE-167884-MS Real-Time Modelling of Drilling Using Nitrogen Enriched Mud: A Case Study. Apr. 1, 2014, pp. 1-27.

* cited by examiner

DETERMINING PROPERTIES OF WELLBORE FLUID SYSTEMS

CROSS-REFERENCE TO RELATED APPLICATIONS

This application is the U.S. national stage application of International Application PCT/NO2022/050053, filed Feb. 25, 2022, which international application was published on Sep. 1, 2022, as International Publication WO 2022/182249 in the English language. The International Application claims priority of Norwegian Patent Application No. 20210267, filed Feb. 26, 2021. The international application and Norwegian application are both incorporated herein by reference, in entirety.

FIELD

The present invention relates to determining properties of wellbore fluid systems, such as the density of a drilling fluid in the downhole environment of a wellbore.

BACKGROUND

Drilling fluids are generally subjected to large variations of pressure and temperature when being circulated in a well. This span of pressures and temperatures in the well is so large that the mass density of the drilling fluid generally differs from one depth to another. Furthermore, in a drilling operation, cuttings etc, typically become entrained in the fluid that is circulating which can further affect its composition. Thus, it can for example be challenging to determine with accuracy the hydrostatic or hydrodynamic pressures in the wellbore.

Usually, the mass density of a drilling fluids is manually measured with a mud balance device on a drilling rig. This process involves taking a sample of the drilling fluid, and then using this sample in the mud balance device to take a measurement. The pressure and temperature dependence of the mass density of the fluid, i.e. its pressure volume temperature (PVT) behaviour, may then be estimated based on the PVT behaviour of its components and their relative proportions. However, continuous variations in composition of the fluid mixture from a well means that there can be uncertainties from the mud-balance method, in particular as to the PVT behaviour of constituent components, and this may lead to inaccuracies in the determined density for different conditions of pressure and temperature and the particular composition of drilling fluid circulating in the wellbore. Operational decisions based on such estimates may therefore also carry corresponding uncertainty and/or risk.

The drilling fluid mass density is however typically important information utilized to calculate the hydrostatic pressure in the borehole. It may also be an important parameter for viscous friction calculations as it appears in the Navier-Stokes equation and also for buoyancy calculations when performing torque and drag or drill-string dynamic estimation. During drilling operations, the drilling fluid mass density is usually measured with a mud balance at regular time intervals. The precision of the mud balance measurements is about $\pm 10 kg/m^3$.

Furthermore, drilling fluids are subject to a wide range of pressures and temperatures and therefore the drilling fluid mass density cannot be considered as constant for the entire range of depths of normal oilfield wells.

Isambourg et al. (see number [7] in the List of References below), found that the pressure and temperature dependence of drilling fluids can be described by a biquadratic function, i.e., a nine parameters model.

The API Recommended Practice 13D (see number [1] in the List of References) recommends utilizing a linear function of temperature combined with a quadratic form of pressure:

$$\rho_m = (A_m + B_m T) + (C_m + D_m T)p + (E_m + F_m T)p^2$$

where $\rho_m$ is the mass density, T is the temperature, p is the pressure, $A_m$, $B_m$, $C_m$, $D_m$, $E_m$ and $F_m$ are the parameters of the pressure, volume and temperature (PVT) model. However, the usual available equipment at rig sites has instead encouraged adoption of other approaches.

A PVT model is for example estimated by utilizing the PVT behaviour of each of the components of the drilling fluid. Indeed, a drilling fluid is a mix of components that are either in a solid or liquid phase of matter. The mass density of the mix is then simply the volumetric weighted average of the mass density of each of the components:

$$\rho_m = \sum_{i \in \Omega} f_i \rho_i, \text{ with } \sum_{i \in \Omega} f_i = 1$$

where $\rho_m$ is the drilling fluid mass density, $\Omega$ is the set of indices for the different components, $f_i$ is the volume fraction of the i-component and $\rho_i$ is the corresponding mass density.

The PVT behaviour of several brines have been described by Kemp et al. (see number [8] in the List of References). Otherwise, the API Recommended Practice 13D, utilizes a similar model as Equation 1 for brine, except that the parameter A0 is replaced by a cubic form of the weight of salt:

$$\rho_w = (S_0 + S_1 w_t + S_2 w_t^2 + S_3 w_t^3 + B_w T) + (C_w + D_w T)p + (E_w + F_w T)p^2$$

where $\rho_w$ is the mass density of the brine, $w_t$ is the weight fraction of the salt at normal condition of temperature and pressure (atmospheric pressure and 297 K). $S_0$, $S_1$, $S_2$, $S_3$, $B_w$, $C_w$, $D_w$, $E_w$, and $F_w$ are the coefficients of the model.

The PVT behaviour of base oils can also be described by Equation 1 and Zamora et al. (see number [11] in the List of References) gives the parameters for several base-oils as well as for some brines.

However, as different components of the fluid mix of a drilling fluid do not have the same compressibility and thermal expansions laws, the volumetric fractions of each of the components changes with various conditions of pressures and temperatures. A method to calculate the volume fractions under changes of pressure and temperature conditions is described in Cayeux et al. (number [3] in the List of References).

A significant problem is that the composition of the drilling fluid changes more or less continuously throughout a drilling operation, either because of the actions taken by the mud engineer to maintain the quality of the drilling fluid, or because of formation fluids and solids that invade the mud while circulating. Even more pragmatically, it is often not easy to get a correct description of the component quantities that are used in the drilling fluid. Cayeux (see number [4] in the List of References) illustrates the impact of the lack of information about the drilling fluid formulation on the estimated hydrostatic pressure.

Existing measurement techniques and uncertainty on the drilling fluid formulation may therefore be inconvenient and poorly suited, and particularly so in processes where accuracy is required such as when seeking to automate a drilling process.

SUMMARY

At least one aim of the invention is to obviate or at least mitigate one or more drawbacks of prior art.

According to a first aspect of the invention, there is provided a method of determining at least one property of a wellbore fluid system, the method comprising the steps of: providing measurement apparatus including at least one pipe section; communicating a drilling fluid through the pipe section; measuring at least one density which is associated with at least one condition of pressure and temperature of the drilling fluid in the pipe section; and using the measured density of the drilling fluid to determine the property of the wellbore fluid system.

The method may further comprise obtaining measurements of density at different conditions of pressure and temperature of the drilling fluid in the pipe section.

The method may further comprise operating the measurement apparatus to provide or control the conditions of pressure and temperature of the drilling fluid.

The method may further comprise: using measurements of the density of the drilling fluid at the different conditions of pressure and temperature to determine a model associated with the drilling fluid; and using the model to determine the property of the wellbore fluid system.

The method may further comprise obtaining measurements of the speed of sound in the drilling fluid, and further using the measurements of the speed of sound to determine the model.

The method may further comprise: providing a heat exchanger, transferring heat to or from the drilling fluid in the pipe section; obtaining temperature measurements at different locations along the pipe section downstream from the heat exchanger, obtaining a temperature development of the drilling fluid along the pipe section; and estimating the thermal conductivity and the specific heat capacity of the drilling fluid using the temperature measurements.

The method may further comprise: estimating the adiabatic compressibility from the speed of sound in the drilling fluid; providing the specific heat capacity and the thermal conductivity of the drilling fluid; and determining the isothermal compressibility of the drilling fluid using: the specific heat capacity; the thermal conductivity; and the adiabatic compressibility; and further using the isothermal compressibility of the drilling fluid to determine the model.

The method may further comprise: providing a model; and using the model and obtained measurements of density at different conditions of pressure and temperature to determine the property of the wellbore fluid system.

The model may be a pressure temperature volume, PVT, model of the drilling fluid. The model may define or may comprise parameters for defining a dependency of density upon pressure and temperature for conditions of pressure and temperature in the wellbore. The model may be or may be based upon a model in parametric form comprising n model parameters or coefficients, and this may be for example an API-recommended model, such as described anywhere herein.

The model may be determined by estimating or fitting or adapting the model to the measurements. The model may be a fitted curve or function or look up table. The model may be used to extrapolate or provide a prediction of the property of the wellbore fluid system at downhole conditions of pressure and temperature in the wellbore.

The step of operating the measurement apparatus to produce the different conditions of the pressure and temperature of the drilling fluid, may comprise operating the measurement apparatus to change or vary either or both the pressure and the temperature of the drilling fluid. For example, the measurement apparatus may further comprise at least one heat transfer device. The measurement apparatus may further comprise at least one pressure determiner device. In such variants, the method may further comprise operating the heat transfer device to change the temperature of the drilling fluid in the pipe section, and the method may further comprise operating the pressure determiner device to change the pressure of the drilling fluid in the pipe section. The pressure determiner device may comprise a back pressure device, such as a flow restrictor, e.g. a flow valve, a back pressure valve, or a choke. The heat transfer device may comprise at least one heat source or heat sink. The heat transfer device may comprise a heating or cooling element to supply heat to or remove heat from the drilling fluid in the pipe section. In this way, the temperature of the drilling fluid may be changed, i.e. increased or reduced, and/or controlled.

The method may further comprise pumping the drilling fluid through the pipe section. The apparatus may include at least one pump for pumping the drilling fluid. The pump may together with the back pressure device be used to determine the pressure of the drilling fluid in the pipe section. The method may further comprise obtaining measurements of temperature of the drilling fluid in the pipe section. The method may further comprise obtaining measurements of the pressure of the drilling fluid in the pipe section.

The property of the wellbore fluid system may comprise any of: a pressure in the wellbore; a density of the drilling fluid in the wellbore; a density related property; a rheological property; a property for controlling a drilling system; a property for use in a managed pressure drilling system.

The parameters or coefficients may be obtained using the measurements from the measurement apparatus and solving simultaneous equations using the measured densities for different conditions of the pressure and temperature of the drilling fluid. The parameters may for example be determined by solving a system of simultaneous equations, the number of simultaneous equations being equal to or greater than the number of parameters or coefficients to be determined. The model may have any number of parameters or coefficients to be determined. The number of parameters or coefficients to be determined may be any integer equal to or greater than three. The number of parameters or coefficients can be referred as n. In some examples then, if only the density is measured then at least n different conditions of pressures and temperatures is necessary in order to determine the parameters or coefficients of the model. However, in some examples, if the thermal expansion or the compressibility of the drilling fluid is also measured at various conditions of pressure and temperature, then it is possible to reduce the necessary number of pressure and temperature conditions. The number of measurements related to compressibility or thermal expansion can be denoted p. Then, the minimum number of pressure and conditions to determine the parameters or coefficients of the model may be: n-p. A possibility to measure the compressibility of the fluid may be to measure the speed of sound in the fluid at a particular condition of pressure and temperature. However, the speed of sound may thus relate to the adiabatic compressibility of the fluid. The adiabatic compressibility of the fluid may then be transformed to an isothermal compressibility if the specific heat capacity of the fluid is provided or determined. The method may include measuring at least one speed of sound in the drilling fluid for reducing the number of different pressure and temperature conditions to a number lower than the number of parameters or coefficients to be determined. The method may include determining or providing at least one specific heat capacity of the drilling fluid for reducing the number of different pressure and temperature conditions to a number lower than the number of parameters or coefficients to be determined. In a model having n parameters to be determined, measurements of the density may be performed using n-p conditions of the pressure and temperature where p is the number of speed of sound measurements. To this end, in various examples, the method may further include measuring the speed of sound in the drilling fluid in the apparatus and obtaining the adiabatic compressibility using the measured speed of sound. The method may further include obtaining the specific heat capacity of the drilling fluid in the apparatus. The method may further include using a heat transfer device, e.g. heat source, to transfer heat to the drilling fluid, and obtaining measurements of temperature of the drilling fluid at locations along the pipe section for determining an evolution of the fluid temperatures of the drilling fluid after passing the heat source. The method may further include obtaining the isothermal compressibility from the specific heat capacity. The specific heat capacity may be determined by numerical computation using discrete element representation of the measurement apparatus.

Preferably, the method includes providing a mathematical model through which the density of the fluid is related to temperature and pressure, e.g. a surface of density in dependence upon temperature and pressure, for determining the density of the fluid in the conditions of the downhole environment of the wellbore. Preferably, the method includes adapting or fitting the model to measurements of density and the determined isothermal compressibility.

According to a second aspect of the invention, there is provided apparatus for determining at least one property of a wellbore fluid system, the apparatus comprising: at least one pipe section for communicating drilling fluid through the pipe section; at least one densitometer; and means configured to obtain data from the densitometer associated with different conditions of pressure and temperature of the drilling fluid, and further configured to process the obtained data to provide measurements of the density of the drilling fluid in the pipe section and use the measurements to determine the property of the wellbore fluid system.

The apparatus may be further configured to produce the conditions of the pressure and temperature of the drilling fluid in the pipe section, e.g. desired conditions. To this end, the apparatus or one or more pipe sections of the apparatus may further comprise any one or more of: at least one heat transfer device for changing or determining the temperature of the drilling fluid in the pipe section; at least one back pressure device for changing or determining the pressure of the drilling fluid; at least one pump for pumping the drilling fluid through and/or along the pipe section. The back pressure may be arranged to impart a back pressure to the drilling fluid in the pipe section.

The apparatus may be further configured to measure the temperature and the pressure of the drilling fluid. More specifically, the apparatus or one or more pipe sections of the apparatus may further comprise, in proximity to the drilling fluid: at least one temperature sensor; at least one pressure sensor; at least one flow meter; at least one speed of sound unit for obtaining the speed of sound in the drilling fluid.

The pipe sections of the apparatus may be arranged to communicate drilling fluid in parallel through one or more pairs of pipe sections. This may facilitate obtaining simultaneously different conditions of pressure and temperature and obtaining data from densitometers of the different pipe sections with the different conditions. The pipe sections may be arranged for communicating drilling fluid through the pipe sections in series, and the apparatus is configured to obtain data from densitometers of different pipe sections, wherein different pipe sections may be configured to have different conditions of pressure and temperature of the drilling fluid.

The apparatus may have at least one pipe section with temperature sensing means for obtaining temperature measurements from several locations along the pipe section. The temperature sensing means may be temperature sensors positioned in different locations along the pipe section. The pipe section with the temperature sensing means may further comprise at least one heater device, e.g. a heating element for heating the drilling fluid in the pipe section. The pipe section with the temperature sensing means may have at least one layer of insulation material around the pipe section for insulating the pipe containing the drilling fluid from a surrounding environment, and substantially preventing heat loss to the surroundings. The temperature sensing means may be positioned downstream with respect to the heater device. The temperature sensing means may be configured to obtain data for determining a temperature evolution of the drilling fluid along the pipe section. The pipe section may include: at least one densitometer; at least one speed of sound device; at least one flow meter; at least one pressure sensor; at least one back pressure device.

The pipe section may be a section of a drilling fluid circulation path. Thus, the drilling fluid being circulated into the wellbore may be communicated through the pipe section. Thus, the pipe section and/or apparatus may advantageously provide for inline continuous measurement of the drilling fluid being carried into the wellbore and/or being carried out of the wellbore, and provide thereby for determination of the property of the wellbore fluid system on an ongoing continuous basis during circulation. The property may be determined to provide input to a managed pressure drilling system. The pipe section may be arranged for fluid communication with a drilling fluid pit. The pipe section may be a section of a topsides flowline for communicating drilling fluid in circulation through wellbore.

The apparatus may further comprise control unit, data processing unit and/or determiner unit. The control unit may be configured to be in communication with the apparatus for controlling any one or more components of the measurement apparatus. The data processing unit may be configured to be in communication with one or more components of the apparatus for receiving and processing data from the components. The determiner unit may be configured to determine the property using the obtained measurements from the apparatus. The components in communication with the data processing unit and from which the data may be obtained may be any one or more of densitometer; the temperature sensor; the pressure sensor; the flow meter; the speed of sound unit. The components in communication with the control unit to be controllable may comprise any one or more of the at least one heat transfer device; the at least one back pressure device; the pump; densitometer; the temperature sensor; the pressure sensor; the flow meter; the speed of sound unit.

The apparatus may further comprise one or more computer devices. The one or more computer devices may be configured to communicate with one or more components for controlling the one or more components. The one or more computer devices may be configured to communicate with one or more components of the apparatus for receiving and processing data from the one or more components. The one or more computer devices may be configured to determine the property of the wellbore fluid system using obtained data from one or more components apparatus. The one or more components to be controlled may comprise any one or more of the at least one heat transfer device; the at least one back pressure device; the pump; densitometer; the temperature sensor; the pressure sensor; the flow meter; the speed of sound unit. The one or more components from which data may be obtained for processing the data and determining the property of the wellbore fluid system may comprise any one or more of densitometer; the temperature sensor; the pressure sensor; the flow meter; the speed of sound unit.

The computer device(s) may be configured to use measurements of at least the density, the temperature, and the pressure to determine parameters of a model to determine a dependency of the density upon the temperature and pressure of the drilling fluid. The computer device(s) may be further configured based upon the model and/or the determination of the parameters to determine the property of the wellbore fluid system.

According to a third aspect of the invention, there is provided a wellbore drilling system including the apparatus in accordance with the second aspect of the invention. The pipe section may be a section of a drilling fluid circulation path in fluid communication with the wellbore for circulating the wellbore into or out of the well through the pipe section.

According to a fourth aspect of the invention, there is provided a computer program for use in performing the method of the first aspect. The computer program may comprise instructions for using measurements of at least the density, the temperature, and the pressure to determine parameters of a model to determine a dependency of the density upon the temperature and pressure of the drilling fluid. The computer device(s), and based upon the model and/or the determination of the parameters to determine the property of the wellbore fluid system.

According to a fifth aspect of the invention, there is provided data storage medium or data carrier carrying the computer program of the fourth aspect of the invention.

According to a fifth aspect of the invention, there is provided a computer device including the computer program of the fourth aspect of the invention.

Any of the aspects of the invention may include further features as described in relation to any other aspect wherever described herein. In particular, various further features of various aspects are defined in the claims appended hereto. For instance, the method of the first aspect may further comprise any one or more further features as set out in the claims appended hereto.

Various embodiments of the different aspects of the invention can be advantageous in various ways that will be apparent from throughout herein. Notably, the apparatus may advantageously allow one to measure directly and automatically the PVT behaviour of the drilling fluid contained in drilling fluid pit and circulating in or out of the wellbore in wellbore drilling system. By providing automatically, and on a continuous basis, the actual PVT behaviour of drilling fluids, drilling automation systems can gain in precision and at the same time, their configuration can be simplified, therefore making them more accessible to any drilling operation.

BRIEF DESCRIPTION OF THE DRAWINGS

There will now be described, by way of example only, embodiments of the invention with reference to the accompanying drawings, in which.

DETAILED DESCRIPTION OF THE DRAWINGS

Drilling System

Figure 1:
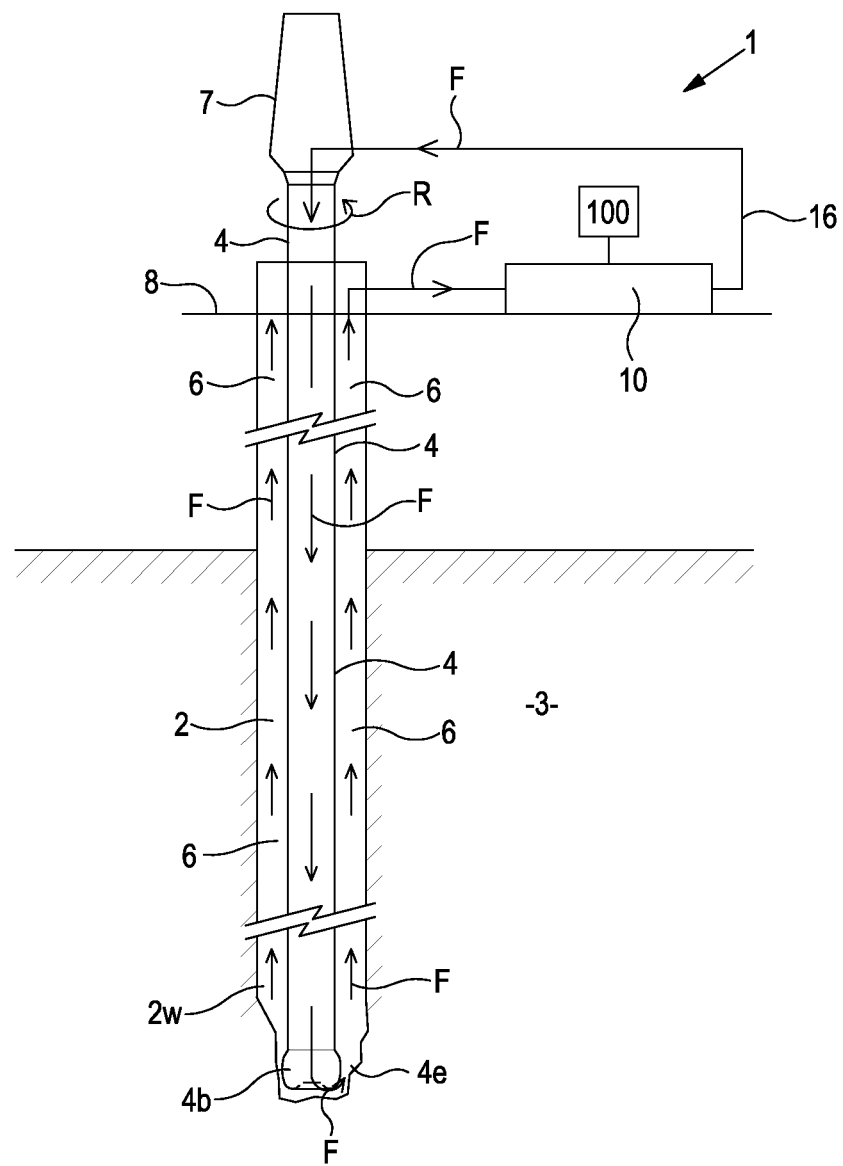
FIG. 1 is a schematic representation apparatus for performing an operation in a wellbore with a drilling fluid being circulated into and out of the wellbore during the operation.

In FIG. 1, there is generally depicted apparatus 1 in the form of a drilling system for drilling a well 2 which has a wellbore 2w extending into in the subsurface 3 of the Earth. A drill string 4 is provided with a drill bit 4b on a penetrating end 4e of the drill string 4. The drill string 4 is rotated as indicated by arrow R, by rotary equipment 7 in this case depicted on a drilling rig platform 8. The rotation and weight against the bit applied via the drill string 4 results in the drill bit cutting into rock formations of the subsurface 3 and advancement of the wellbore 2w into the subsurface 3. To facilitate in the drilling process, drilling fluid is pumped into the well through an inside of the drill string 4 and circulated out of the well upward along the drill string 4 in an annulus 6 around an outside of the drill string 4. The fluid returning from the well is directed through a topsides flow line 16 pumped back into the well 2 through the drill string 4. This circulation of the drilling fluid into and out of the well is indicated by arrows F. The drilling fluid may ease rotation and the cutting ability of the drill bit 5, may serve to apply a positive pressure upon the formation of the wellbore during drilling to hinder inflow, and may facilitate to carry cuttings and debris out of the well to surface as the hole is being drilled.

At the surface (i.e. on the topsides rig 8), the apparatus 1 includes a measurement apparatus 10 for performing various measurements of parameters of the drilling fluid in the topsides measurement environment for determining and predicting the density of the drilling fluid in the conditions of the wellbore environment. The measurement apparatus 10 functions to determine the density as a function of pressure and temperature. Furthermore, the measurement apparatus 10 is connected so that returning drilling fluid is received continuously from the wellbore 2, passes through the apparatus 10 and continues along the flowline 16 back to the well. Using the measurements from the measurement apparatus 10, a model is determined or selected, e.g. using computer apparatus 100, and based on this model the density of the fluid in the wellbore at wellbore conditions of pressure, temperature can be obtained. These data can provide input for controlling the drilling process. For example, based on such data, operators may determine rotation rates, dynamic and static behaviour of the drilling fluid, fluid additives, directions of drilling, etc. This can be of particular use in automated drilling operations, such as Managed Pressure Drilling operations. The measurement apparatus 10 can be arranged in line with the well so as to be fed continuously with drilling fluid from the wellbore. It can then automatically and continuously measure parameters of the drilling fluid. Therefore, data is continuously made available from the measurement apparatus 10 and such data can be used for input to the drilling operations and control software for controlling the drilling and circulation of drilling fluid in the operations.

Measurement Apparatus #1

Figure 2:
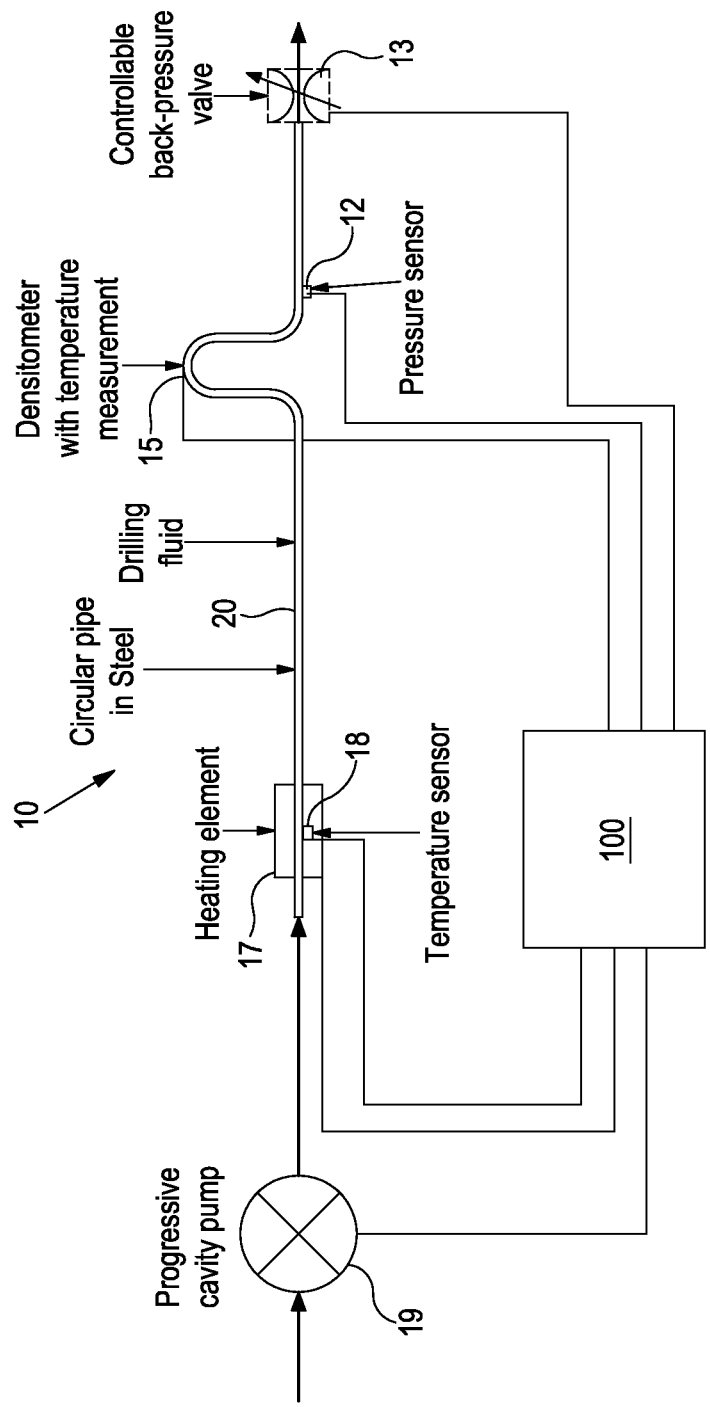
FIG. 2 is a schematic representation of measurement apparatus for determining density of a drilling fluid in wellbore conditions according to one example.

Turning now to FIG. 2, the measurement apparatus 10 will now be described in further detail. The measurement apparatus 10 comprises a pipeline 20 through which drilling fluid is conveyed. A pump 19 is used to communicate the drilling fluid through the pipe 20 from an upstream end to a downstream end of the pipe.

Moving from upstream toward downstream along the pipeline, the apparatus 10 in a first location along the pipe 20 is provided with a heater element 17 together with a temperature sensor 18. The heater element 17 can supply heat to the drilling fluid at that location, and as a result the temperature of the drilling fluid is caused to increase. The temperature sensor 18 is used so that the temperature of the drilling fluid can be detected and measured at that location.

In a further location along the pipeline 20, the pipeline 20 is provided with a densitometer 11 for obtaining measurements of density of the drilling fluid. At the same location, the densitometer also includes a temperature sensor by which the temperature of the drilling fluid is detected and can be measured.

In a yet further location along the pipe, the pipeline 20 is provided with a pressure sensor 12. The pressure sensor 12 is used to detect the pressure in the drilling fluid.

Downstream from the pressure sensor 12, a controllable back pressure valve 15 is provided. The back pressure valve 13 has a controllable aperture for restricting the flow of drilling fluid through the valve 13, and in cooperation with pump 19 therefore may be operated to facilitate controlling the pressure of the drilling fluid along the pipeline.

The computer device 100 is arranged in communication with the measurement apparatus 10, in particular with each of the pump 9, the heating element 17, the temperature sensor 18, the densitometer 15, the pressure sensor 12, and the back-pressure valve 13. The computer 100 can control the operation of the measurement apparatus as required. Data from each of the pump 9, the heating element 17, the temperature sensor 18, the densitometer 15, the pressure sensor 12, and the back-pressure valve 13 can be received by the computer device 100 through input/output means. The computer device has a processor for processing the data, a memory for storing the data and/or for storing one or more computer programs containing instructions which when executed by the processor causes the computer device to operate accordingly. As will be explained further below, the data obtained can be used to characterize and determine properties of the wellbore fluid system. The data may be used to determine a model of the drilling fluid for determining the dependence of density upon the pressure and temperature, for predicting the mass density of the fluid or other property of the fluid system dependent upon the density in well conditions. The data may be used to develop or determine parameters of a mathematical model of the mass density behaviour for allowing the mass density to be predicted. At least one computer program is provided for doing so.

In use, the measurement apparatus 10 is operated to obtain measurements of the density from the densitometer 15, the temperature from the temperature sensor(s) 18, and the pressure from the pressure sensor 12. The heater element 18 is used to vary the temperature. The back pressure valve and pump are used to vary the pressure. Through appropriate control of the heater and back pressure valve and pump, the measurements of the density are obtained for different pressures and temperatures of the drilling fluid.

Model Determination #1

The measurements are applied to determine a model for the mass density as a function of pressure and temperature, for example a model as expressed by the following equation which is based upon the API Recommended Practice 13D (number [1] in the List of References) of utilizing a linear function of temperature combined with a quadratic form of pressure:

$$\rho_m = (A_m + B_m T) + (C_m + D_m T)p + (E_m + F_m T)p^2 \quad \text{(Equation 1)}$$

where $\rho_m$ is the mass density, T is the temperature, p is the pressure, $A_m$, $B_m$, $C_m$, $D_m$, $E_m$ and $F_m$ are the parameters of the pressure, volume, and temperature (PVT) model.

In general, a system of n-equations with n coefficients to be determined is obtained. In this example, the apparatus 10 is operated to obtain measurements of the density for at least six different pairs of pressure and temperature. This allows the following system of six equations with the six parameters $A_m$, $B_m$, $C_m$, $D_m$, $E_m$ and $F_m$ as unknowns to be solved:

$$\begin{cases} \rho_{m_1} = (A_m + B_m T_1) + (C_m + D_m T_1)p_1 + (E_m + F_m T_1)p_1^2 \\ \rho_{m_2} = (A_m + B_m T_2) + (C_m + D_m T_2)p_2 + (E_m + F_m T_2)p_2^2 \\ \rho_{m_3} = (A_m + B_m T_3) + (C_m + D_m T_3)p_3 + (E_m + F_m T_3)p_3^2 \\ \rho_{m_4} = (A_m + B_m T_4) + (C_m + D_m T_4)p_4 + (E_m + F_m T_4)p_4^2 \\ \rho_{m_5} = (A_m + B_m T_5) + (C_m + D_m T_5)p_5 + (E_m + F_m T_5)p_5^2 \\ \rho_{m_6} = (A_m + B_m T_6) + (C_m + D_m T_6)p_6 + (E_m + F_m T_6)p_6^2 \end{cases} \quad \text{(Equation 2)}$$

where $\rho_{m_1}$, $\rho_{m_2}$, $\rho_{m_3}$, $\rho_{m_4}$, $\rho_{m_5}$, $\rho_{m_6}$ are the measured mass densities at respective conditions of pressure and temperatures $(p_1, T_1)$, $(p_2, T_2)$, $(p_3, T_3)$, $(p_4, T_4)$, $(p_5, T_5)$, $(p_6, T_6)$. This system of equations is linear in $A_m$, $B_m$, $C_m$, $D_m$, $E_m$ and $F_m$ and can be solved using for instance a Gauss Jordan method, see for example Press et al. (number in the List of References).

By solving these equations therefore, the parameters $A_m$, $B_m$, $C_m$, $D_m$, $E_m$ and $F_m$ and the applicable model for the drilling fluid passing through the apparatus 10 is determined. Having determined the model that is representative of that drilling fluid, the model can be used to determine the mass density of the drilling fluid for conditions of pressure and temperature in the wellbore. The pressure and temperatures in the wellbore may for instance be estimated or otherwise measured using sensors, e.g. on the drilling or other equipment in the wellbore. The mass density can be calculated from the model for other values of temperature and pressure such as those values at wellbore conditions. Thus, the model can be stored as a mathematical formula allowing input of temperature and pressure to determine the density according to the model for the input temperature and pressure conditions, e.g. downhole wellbore pressure and temperature conditions.

The model can take various forms, and can for instance be a database, library, table of values that may be looked up for the desired values of pressure and temperature, in particular higher pressure and temperatures outside of the range sampled by use of the apparatus. The model can be a graph that allows extrapolation to the temperature and pressure conditions of the wellbore. The model can also be a graph that is fitted to the data points of measured density from the model.

The measurement apparatus 10 can in this manner advantageously provide accurate online continuous measurement and determination of density of the drilling fluid for wellbore conditions. The measurements are carried out on the bulk drilling fluid sent through the apparatus and they take account therefore of the contributions of different components in the fluid and variations in composition of the fluid over time in use. The determinations of density for wellbore conditions can therefore be more accurate or have lower uncertainty than previous techniques may allow.

The measurement apparatus 10 can thus be used to provide an estimation of the density at higher pressures and temperatures without actually having to increase the temperature and pressure of the drilling fluid in the pipeline 20 of the measurement apparatus 10 to the higher temperatures or pressures expected to be experienced in the wellbore. This can be advantageous as the temperatures and pressures in the wellbore do increase to significant values at depth. The measurement apparatus 10 can therefore be made compact and requirements for the heater element and pressure containment may be less strenuous.

The accuracy of the model in predicting the density at higher pressures and temperatures, e.g. typical wellbore pressure and temperature conditions has been tested to determine what range of pressures and temperatures applied in the measurement apparatus 10 would be sufficient to extrapolate the model at higher pressure and temperature conditions with acceptable accuracy. If the densitometer 15 has a measurement precision of 0.05 kg/m$^3$ and a repeatability of 0.01 kg/m$^3$, stochastic simulations of the possible measurement error can be performed for various tested spans of investigated pressures and temperatures. In one test, the calibrated model (i.e. the model determined from measurements in the apparatus 10, i.e. a PVT model) is assumed to be used for predicting the density in the range of pressures of up to 1000 bar and in the range of temperatures of up to 200° C., and the root mean square (RMS) of the proportional error between the predicted density value and the "true" value is calculated when varying stochastically the systematic bias in the density measurement when the calibration test fluid spans a small range of pressures and a small range of temperatures. Results were obtained for 250 stochastic simulations per estimation. The results show that to achieve a 5% average accuracy for the entire span of pressure of up to 1000 bar and the span of temperature of up to 200° C., at least a span of pressure of 30 bar and a span of temperature of 25° C. is needed for operation of the apparatus 10 during measurements.

The apparatus 10 is therefore configured so that this span is achievable, which again can facilitate the accuracy of the determination of wellbore temperature and pressure based on the determined model. Of course, other variants of the measurement apparatus 10 are possible where it is operated to obtain measurements at pressures and temperatures which do not have that span of pressures or temperatures, and such variants may provide useful predictions of good or sufficient accuracy for many wells and/or operations.

Measurement Apparatus #2 and #3

Figure 3:
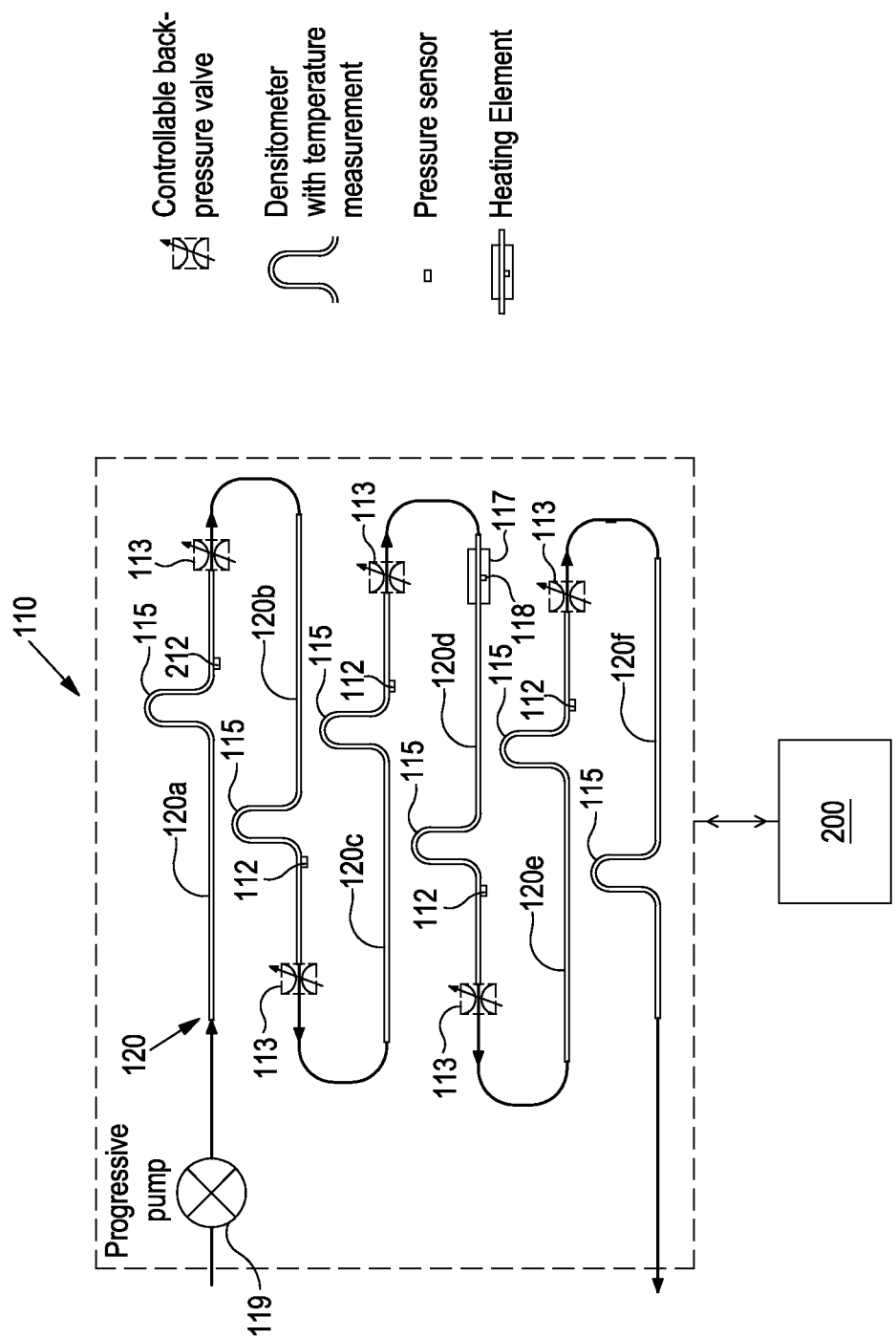
FIG. 3 is a schematic representation of measurement apparatus for determining the density of a drilling fluid in wellbore conditions according to another example.

With reference now additionally to FIG. 3, measurement apparatus 110 is generally depicted where features that correspond to those seen in FIG. 2 are referenced with the same reference numerals but incremented by one hundred. The measurement apparatus 110 the pipeline 120 has six measurement pipe sections 120a, 120b, 120c, 120d, 120e, 120f arranged one after the other in series. In this way, upstream of the first pipe section 120a, the apparatus includes the cavity pump 119 for driving the drilling fluid through the sections of the pipeline 120. The first three pipe sections 120a-120c are configured similarly, where each comprises a densitometer 115 with temperature sensor, a temperature sensor 112 at a location downstream from the densitometer, and then a controllable back pressure valve 113. The fourth section 120d, has a heating element 117 with temperature sensor 118 applied at an upstream location, then comprises a densitometer 115 with temperature sensor, a pressure sensor 112 at a location downstream from the densitometer, and a controllable back pressure valve 113. Like the first to third sections 120a-120c, the fifth section 120e, has a densitometer 115 with temperature sensor, a pressure sensor 112 at a location downstream from the densitometer, and a controllable back pressure valve 113. The fifth section 120e, has a densitometer 115 with temperature sensor. The apparatus 110 is in communication with computer apparatus 200 for controlling the apparatus 110 and acquiring data from the densitometers, temperature sensors, and pressure sensors. The configuration of the measurement apparatus 110 can be advantageous as the measurements of the density, the pressure and the temperature in the different pipe sections can be obtained from the apparatus simultaneously or consecutively. In the first three pipe sections 120a-120c the temperature of the drilling fluid naturally decreases as the drilling fluid flows along the section to allow obtaining different temperature values. The pressure can be set for each section by controlling the respective back pressure valves 113 accordingly. In the following three pipe sections 120d-120f the temperature of the drilling fluid is controlled by way of the heater element 119. The temperature again decreases upon flow through the pipe sections 120d-120f and the pressures are controlled by the back pressure valve 113. The last section 120f does not require its own back pressure valve or pressure sensor as the pressure flowing out of the apparatus 110 can be left to drop to atmospheric pressure conditions, e.g. in mud pit, which is also a pressure condition, and may help to reduce the equipment and complexity of the apparatus 110. Measurements from the apparatus 110 may thus be obtained without reduced delay and may therefore be more accurate by avoiding effects of the drilling fluid which may be changing in composition during flow through the apparatus during operations and in the period required to obtain the measurements necessary to determine the model.

Figure 4:
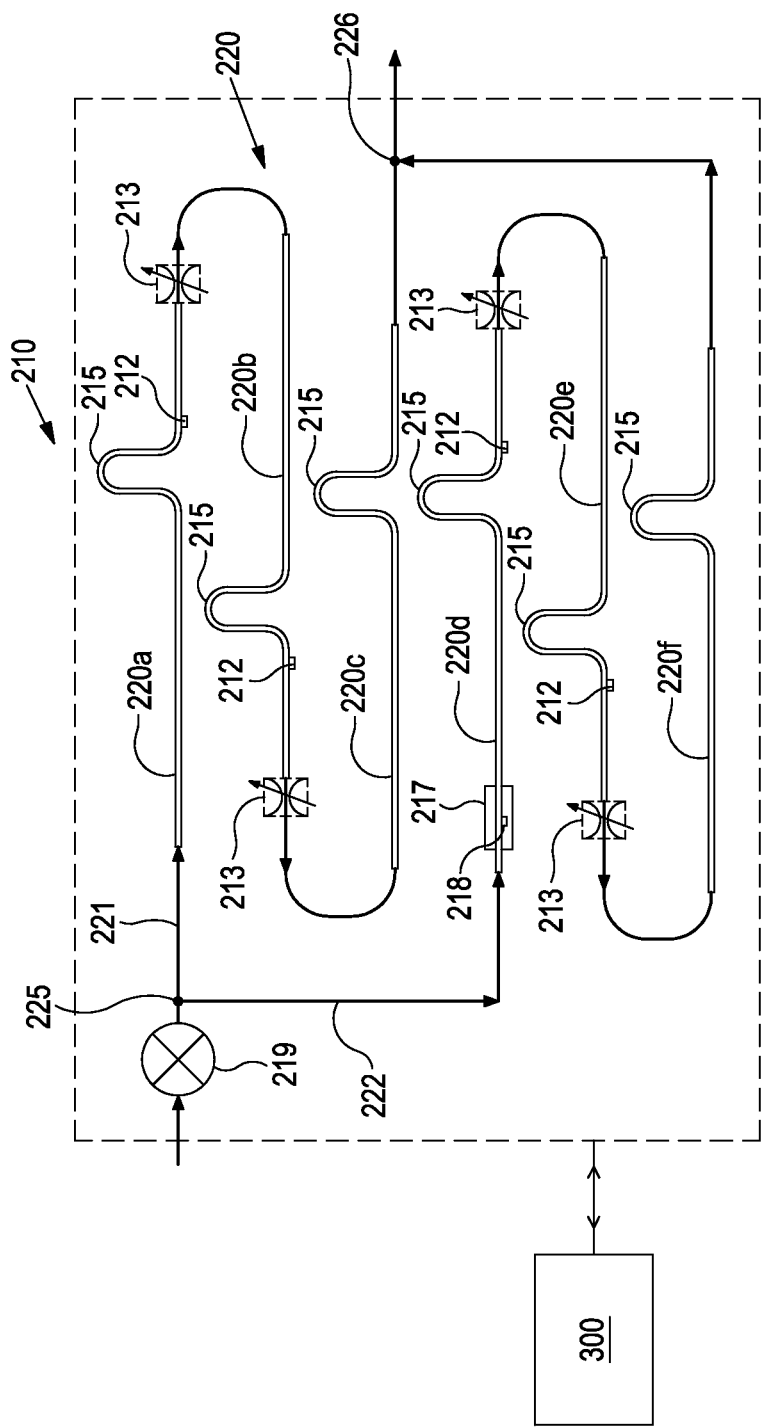
FIG. 4 is a schematic representation of measurement apparatus for determining the density of a drilling fluid in wellbore conditions according to yet another example.

With reference now to FIG. 4, measurement apparatus 210 is generally depicted where features that correspond to those seen in FIG. 2 are referenced with the same reference numerals but incremented by two hundred. The measurement apparatus 210 has in this example a two-branch pipeline 220 having pipeline branches 221, 222 and two sets of pipe sections, one set per branch, operating in parallel. The pipeline splits into the branches 221, 222 at a branch point 225. The first branch 221 includes the first three pipe sections 220a, 220b, 220c and the second branch 222 includes the other three pipe sections 220d, 220e, 220f. In this way, upstream of the branch point 225, the apparatus 210 includes the cavity pump 219 for driving the drilling fluid through the respective branches and sections of the pipeline 220.

The first two pipe sections 220a, 220b of the first branch 221 are configured similarly and each comprises a densitometer 215 with temperature sensor, a pressure sensor 212 at a location downstream from the densitometer 215, and then a controllable back pressure valve 213. The third section 220c comprises a densitometer 215 with temperature sensor.

The first section 220d of the second branch 221 has a heating element 217 with temperature sensor 218 applied at an upstream location, then comprises a densitometer 215 with temperature sensor, a pressure sensor 212 at a location downstream from the densitometer 215, and a controllable back pressure valve 213. The second section 220e of the second branch 221, has a densitometer 215 with temperature sensor, a pressure sensor 212 at a location downstream from the densitometer 215, and a controllable back pressure valve 213.

The third section 220e of the second branch 221, has a densitometer 215 with temperature sensor.

The downstream ends of the first and second branches merge together again at a merge point 226 for passing the drilling fluid from the branches into the common pipeline 120 and onward downstream, e.g. for recirculation into the wellbore. The densitometers 215 with temperature sensors, the pressure sensors 212, the back pressure valves 213 and the heater 217 with temperature sensor 218 are configured to be operable as in earlier described examples above.

The apparatus 210 includes a computer device 300 for controlling the measurement apparatus 210 as appropriate for providing the different pairs of different temperature and pressure and mass density for the drilling fluid circulating through the apparatus 210. The measurement apparatus 210 can be advantageous in that fewer back-pressure valves 213 are utilized than in the apparatus 110, which can simplify the complexity of control and may reduce the size of apparatus 210. By splitting into parallel branches 221, 222, measurements may be more accurate and may further avoid possible effects of changes in drilling fluid composition during the obtaining of the data from the densitometers 215 with temperature sensors and pressure sensors 212 as needed for the model. As can be appreciated, other combinations of parallel and inline arrangements of pipe sections can clearly be provided to provide measurement apparatus for obtaining the density measurements and different pairs of pressure and temperature measurements. Such apparatus can have pipe sections comprising one or more of those as described in earlier examples, in any suitable combination.

Measurement Apparatus #4

Figure 5:
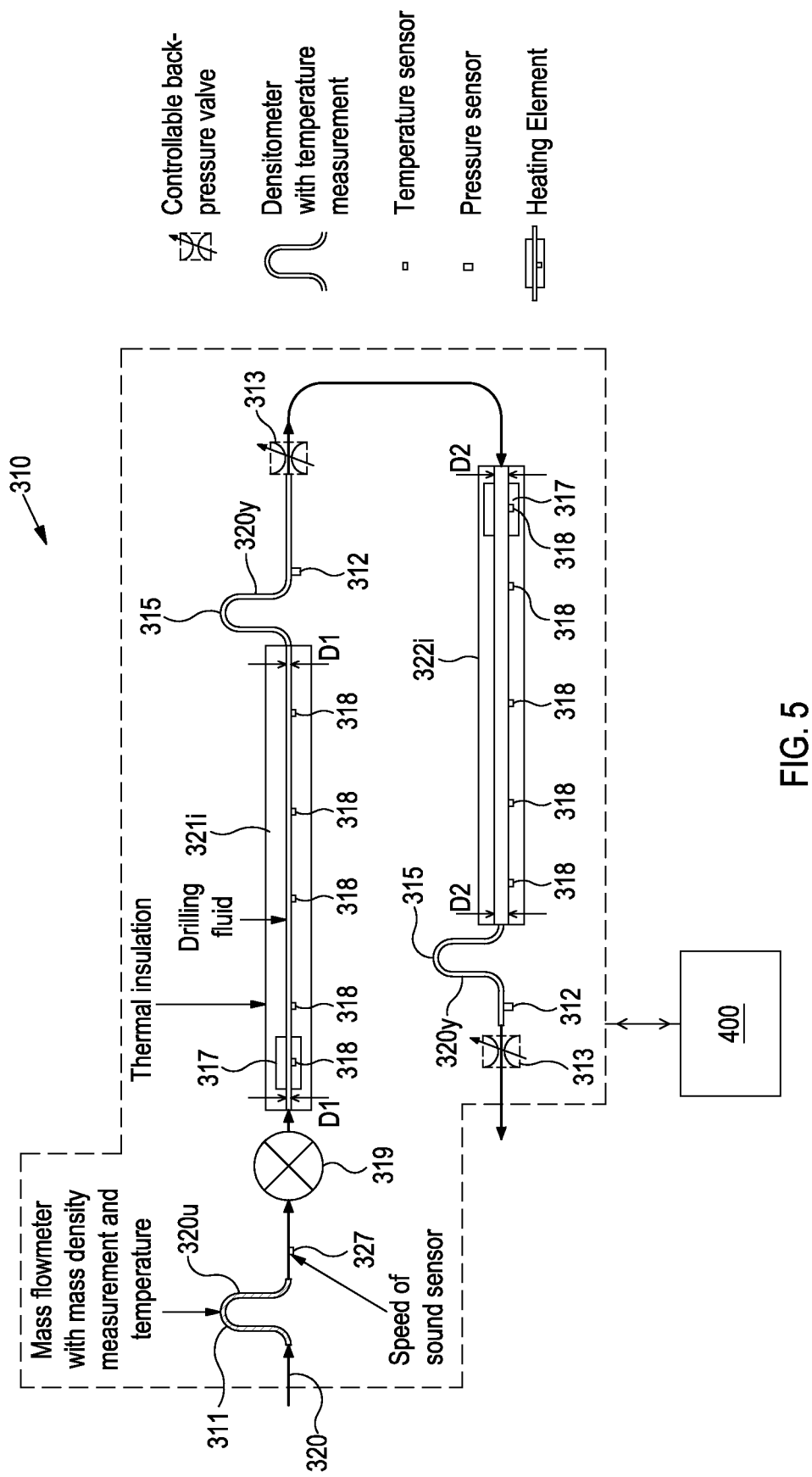
FIG. 5 is a schematic representation of measurement apparatus for determining the density of a drilling fluid in wellbore conditions according to yet another example.

Turning now to FIG. 5, another measurement apparatus 310 is depicted where features that correspond to those seen in earlier examples are referenced with the same reference numerals as used in FIG. 2 but incremented by three hundred. The measurement apparatus 310 has a pipeline 320 which includes various features which moving from upstream toward downstream locations will be described further.

The first part of the pipeline 320, has a section 320u provided with a flow meter 311 for measuring the flow rate of the drilling fluid. The flow meter 311 also includes a density sensor and temperature sensor. Downstream from the flow meter 311, is provided a speed of sound detector 327 for detecting the speed of sound in the drilling fluid, and thereafter a progressive cavity pump 319 for pumping the drilling fluid along the pipeline 320. Downstream from the pump 319, a first insulated pipe section 321i is provided of constant diameter D1 through which the drilling fluid is conveyed. Along the insulated pipe section 321i, at an upstream location of the pipe section 321i, a heating element 317 is provided for supplying heat to the drilling fluid in the pipe section 321i and/or for thereby varying or controlling the temperature of the drilling fluid in the pipe section 321i. Temperature sensors 318 are positioned in locations along the first insulated pipe section 321i for detecting temperatures in the drilling fluid being conveyed through the pipe section 321i. The pipeline 320 includes thereafter a further section 320y provided with a densitometer 315. The densitometer 315 includes a further temperature sensor for detecting the temperature of the drilling fluid, and a further speed of sound detector for detecting the speed of sound in the drilling fluid. After the further section 320y is provided a pressure sensor 312 for detecting a pressure in the drilling fluid, and downstream of that, a back pressure valve 313 operable to restrict the flow through the valve for controlling the backpressure in the first pipe section 321i.

The second part of the pipeline, downstream from the first part has a second insulated pipe section 322i of constant diameter D2 through which the drilling fluid is conveyed. The diameter D2 is a significantly larger diameter than the diameter D1 of the first insulated pipe section 321i. This provides two measurement conditions for enabling heat capacity and thermal conductivity determinations. Along the second insulated pipe section 322i, at an upstream location thereof, a heating element 317 is provided for supplying heat to the drilling fluid in the pipe section 322i for thereby varying or controlling the temperature of the drilling fluid in the pipe section 322i. Temperature sensors 318 are positioned in locations along the second insulated pipe section 322i for detecting temperatures in the drilling fluid being conveyed through the pipe section 322i. The pipeline 320 includes thereafter a yet further section 320y provided with a densitometer 315. The densitometer 315 includes a yet further temperature sensor for detecting the temperature of the drilling fluid, and a yet further speed of sound detector for detecting the speed of sound in the drilling fluid. After the yet further section 320y is provided a pressure sensor 312 for detecting a pressure in the drilling fluid, and downstream of that, a back pressure valve 313 operable to restrict the flow through the valve for controlling the backpressure.

The measurement apparatus 310 is in communication with computer device 400 for controlling and obtaining data from the sensors, densitometer detectors etc. The measurement apparatus 310 is configured advantageously to facilitate obtaining accurate measurements from more compact equipment as compared with earlier described examples such as those of FIG. 2 and/or FIG. 3.

Model Determination #2

A further, compressibility-based, model is developed for allowing suitable measurements to be obtained from the apparatus 310. This can allow the apparatus 310 to be used obtain measurements for determining the parameters of the model for determining the mass density of the drilling fluid in wellbore conditions using fewer pressure and temperature conditions than in earlier described apparatus.

By way of the apparatus 310, not only the mass density but also the compressibility of the drilling fluid can be obtained. The model utilizing the compressibility and mass density can be developed as follows. The isothermal compressibility ($\kappa_T$) of a fluid is defined as (see Landau and Lifshitz (number [9] in the List of References)):

$$\kappa_T = -\frac{1}{V}\left(\frac{\partial V}{\partial p}\right)_T \quad \text{(Equation 3)}$$

where V is the volume, ρ is the pressure, and T is the temperature. The volume is related to the mass density $\rho_m$ through:

$$V = \frac{m}{\rho_m} \quad \text{(Equation 4)}$$

where m is the mass of matter contained in the volume V. Using the above, the isothermal compressibility ($\kappa_T$) of the fluid in terms of the PVT model of (Equation 1) is:

$$\kappa_T = \frac{(C_m + D_m T) + 2(E_m + F_m T)p}{(A_m + B_m T) + (C_m + D_m T)p + (E_m + F_m T)p^2} = \frac{1}{\rho_m}((C_m + D_m T) + 2(E_m + F_m T)p) \quad \text{(Equation 5)}$$

The definition of the speed of sound (c) in matter is:

$$c^2 = \left(\frac{\partial p}{\partial \rho}\right)_S \quad \text{(Equation 6)}$$

where S is the entropy. Based upon this, the isentropic compressibility ($\kappa_S$) is:

$$\kappa_S = -\frac{1}{V}\left(\frac{\partial V}{\partial p}\right)_S \quad \text{(Equation 7)}$$

The relation between the isentropic compressibility and the speed of sound in the medium can be expressed as:

$$\kappa_S = \frac{1}{\rho c^2} \quad \text{(Equation 8)}$$

Finally, the isentropic compressibility is related to the isothermal compressibility through the following relation (Landau and Lifshitz (number [9] in the List of References)) according to:

$$\kappa_S = \kappa_T - \frac{\alpha^2 T}{\rho C_p} \quad \text{(Equation 9)}$$

-continued where $\alpha = \frac{1}{V}\left(\frac{\partial V}{\partial T}\right)_p$ is the volumetric coefficient of thermal expansion and $C_p$ is the isobaric specific heat capacity. Using the above, the volumetric coefficient of thermal expansion in terms of the PVT model coefficients is:

$$\alpha = -\frac{B_m + D_m p + F_m p^2}{(A_m + B_m T) + (C_m + D_m T)p + (E_m + F_m T)p^2} = -\frac{1}{\rho_m}(B_m + D_m p + F_m p^2) \quad \text{(Equation 10)}$$

Thus, if the mass density and the speed of sound is obtained, a system of equations readily solvable with only three conditions of pressures and temperatures can be written:

$$\begin{cases} \frac{1}{c_1^2} = ((C_m + D_m T) + 2(E_m + F_m T_1)p_1) - \frac{T_1}{\rho_{m_1}^2 C_{p_{T_1}}}(B_m + D_m p_1 + F_m p_1^2)^2 \\ \frac{1}{c_2^2} = ((C_m + D_m T) + 2(E_m + F_m T_2)p_3) - \frac{T_2}{\rho_{m_2}^2 C_{p_{T_2}}}(B_m + D_m p_2 + F_m p_2^2)^2 \\ \frac{1}{c_3^2} = ((C_m + D_m T) + 2(E_m + F_m T_3)p_3) - \frac{T_3}{\rho_{m_3}^2 C_{p_{T_3}}}(B_m + D_m p_3 + F_m p_3^2)^2 \\ \rho_{m1} = (A_m + B_m T_1) + (C_m + D_m T_1)p_1 + (E_m + F_m T)p_1^2 \\ \rho_{m2} = (A_m + B_m T_2) + (C_m + D_m T_2)p_2 + (E_m + F_m T)p_2^2 \\ \rho_{m3} = (A_m + B_m T_3) + (C_m + D_m T_3)p_3 + (E_m + F_m T)p_3^2 \end{cases} \quad \text{(Equation 11)}$$

where $c_1$, $c_2$, $c_3$ are the respective speeds of sound for the conditions of pressure and temperature ($p_1$, $T_1$), ($p_2$, $T_2$), ($p_3$, $T_3$), $\kappa_{p_1,T_1}$, $\kappa_{p_2,T_2}$, $\kappa_{p_3,T_3}$ are the estimated isothermal compressibility coefficients at the respective conditions of pressure and temperature ($p_1$, $T_1$), ($p_2$, $T_2$), ($p_3$, $T_3$), $\alpha_{p_1,T_1}$, $\alpha_{p_2,T_2}$, $\alpha_{p_3,T_3}$ are the estimated volumetric coefficients of thermal expansion at the respective conditions of pressure and temperature ($p_1$, $T_1$), ($p_2$, $T_2$), ($p_3$, $T_3$).

The obtained system of equations is non-linear. This system can readily be solved for the various coefficients using suitable iterative solutions based on linear algebra methods. Alternatively, it can be solved as a minimization problem where the coefficients or parameters of the model are those that minimize the difference between the left and right terms on each side of the equal signs of the equations of the system described by Equation 11. The minimization can be solved using numerical methods such as Gauss-Newton, Levenberg-Marquart or more statistic-based methods such as simulated annealing, particle swarm optimization or genetic algorithms.

As can be appreciated from Equation 11, three different pressures $p_1$ to $p_3$, three different temperatures $T_1$ to $T_3$, speed of sound c, the heat capacity $C_p$ at the respective temperatures, and mass density are to be determined from the apparatus 310 for the various conditions of pressure and temperature. From this the system can be solved for obtaining the parameters $A_m$, $B_m$, $C_m$, $D_m$, $E_m$ and $F_m$ to provide the model that will allow prediction of the density of the drilling fluid in wellbore conditions.

The accuracy of this further model in predicting the density at higher pressures and temperatures, e.g. typical wellbore pressure and temperature conditions has been tested to determine what range of pressures and temperatures applied in the measurement apparatus 310 would be sufficient to extrapolate the model at higher pressure and temperature conditions with acceptable accuracy.

In an accuracy test, the speed of sound is assumed to be measured with an uncertainty of 0.1 m/s and a repeatability of 0.01 m/s and the densitometer 315 has a measurement precision of 0.05 kg/m³ and a repeatability of 0.01 kg/m³. Results from tested spans of investigated pressures and temperatures, show that it is possible to achieve a precision better than 5% on average for the range of pressures and temperatures to be predicted from the model in the range of up to 1000 bar and up to 200° C. respectively in the case of using three measurements of temperature and pressure within a span of 60 bar and 5° C. This indicates that the model using the apparatus 310 and the associated model using three conditions of pressure and temperature can be effective when these are obtained within that span.

Determining Heat Capacity and Thermal Conductivity

If the specific heat capacity is not already known, then it can be determined using the apparatus 310, through appropriate measurement and determination of heat flow/heat transfer behaviour. Furthermore, the apparatus 310 allows for the heat capacity to be determined as well as the thermal conductivity of the drilling fluid. The thermal conductivity is used for determinations of the heat capacity and can be useful in its own right for understanding the thermal behaviour of the drilling fluid.

In order to determine the specific heat capacity, the apparatus 310 is configured for example with the first and/or second pipe sections 321$i$, 322$i$ as follows. Each pipe section 321$i$, 322$i$ comprises a pipe of metal with the temperature sensor on an outer metal surface of the wall of the pipe. The pipe is made of stainless steel and has a circular cross section and is 2 m long. The heat source element 317 is made of aluminium, it is 20 cm long and has a diameter of 10 cm. The temperature sensors 318 are placed 25 cm apart from each other along the pipe. The insulation material around the metal pipe is 3 cm thick. The first temperature sensor downstream to the heating element is positioned only 10 cm above the top of the heating element and therefore is largely influenced by the heat source 317. The pipe of the second insulated pipe section 322$i$ has a greater diameter than the pipe of the first insulated pipe section 321$i$, such that the drilling fluid in the respective sections have different velocities. The first pipe section 321$i$ has a diameter of 20 mm, the second pipe section 322$i$ has a larger diameter. The temperature measurements at two different fluid velocities, provides two different measurement conditions for heat transfer and allows therefore to determine both the specific heat capacity and the thermal conductivity of the heat transfer model for the drilling fluid, the mass density already being determined through measurement in the two sections.

In the apparatus 310, at least three different pairs of pressure and temperature conditions are readily obtained, for example as follows: a first condition based on the pressure and temperature conditions at an inlet to the pipe section 321$i$, 322$i$; a second condition based on increasing the temperature by a few degrees but under a pressure around 50 to 60 bar; and a third condition using an additional increase of temperature of a few more degrees while working under 25 to 30 bar of pressure. Accordingly, the volumetric flowrate and mass density in the first condition of pressure and temperature are measured with the Coriolis flowmeter 311, and the speed of sound sensor 327 is used in line with the inlet to the cavity pump 319 to measure the speed of sound in the fluid. Downstream of the pump 319, the heating element 317 increases the temperature of the fluid by a few degrees and the temperature distribution along the pipe 321$i$ is measured by at least four temperature sensors 318 along the pipe section 321$i$. The second conditions of pressure and temperature are thereby provided. The mass density and speed of sound is measured under the second conditions of temperature and pressure. The local pressure condition is created by a choke. The pipeline 320 continues into the pipe section 322$i$ of a different diameter to the first pipe section 321$i$, in order to create fluid velocity conditions that are different from upstream. A similar heating element 317 increases the temperature of the fluid and at least four temperature sensors 318 placed along the pipe 322$i$ are used to acquire the temperature distribution under a different condition of fluid velocity. Another combined sensor 315 measures the mass density and the speed of sound under the third conditions of temperature and pressure. The pressure condition is imposed by a second choke 313.

By using measurements from the apparatus 310 from the flowmeter 311, the speed of sound sensor 327, the temperature sensors 318, and the densitometer 315 with speed of sound and temperature sensors, at the at least three conditions of pressure and temperature, the model coefficients of Equation 11 can be determined, and the thermal conductivity and the heat capacity can be determined if they are not known.

With regard to determining the specific heat capacity and thermal conductivity if they are not known, the specific heat capacity is defined (see Landau and Lifshitz (number [9] in the List of References)) as:

$$C_p = \left(\frac{1}{m}\frac{\partial Q}{\partial T}\right)_p \quad \text{(Equation 12)}$$

where Q is the amount of heat, i.e. it characterizes the amount of energy that is necessary to change the temperature of a certain mass of matter.

The energy conservation of a physical system under isobaric conditions (Corre et al. (number [6] in the List of References)) is:

$$\frac{\partial \rho H}{\partial t} = \nabla\left(\vec{Q}_f + \vec{Q}_c\right) + q_s \quad \text{(Equation 13)}$$

where H is the enthalpy per unit mass, $\vec{Q}_f = \rho_m H \vec{v}$ is the forced-convective heat flow, $\vec{Q}_c$ is the conductive and natural convective heat flow and $q_s$ is a heat source per unit time and per unit length.

For an isotropic solid, like steel or an insulating material, the pure conductive heat flow is expressed as:

$$\vec{Q}_c = \lambda \nabla T \quad \text{(Equation 14)}$$

where $\lambda$ is the thermal conductivity.

To estimate the natural convective heat flow in a fluid like the drilling fluid, e.g. drilling mud, the Nusselt number ($N_{u_L}$) can be used:

$$N_{u_L} = \frac{h_L L}{\lambda} \quad \text{(Equation 15)}$$

where $N_{u_L}$ is the Nusselt number in the heat flow direction, $$h_L = \frac{q}{\Delta T}$$

is the convective heat transfer coefficient in the heat flow direction, L is the characteristic length, q is the heat flux, i.e. thermal power per unit area, $\Delta T$ is the temperature difference. The Nusselt number can be readily estimated using available techniques.

A relationship for the system of the drilling fluid in the pipe can then be developed based on the energy conservation (see Equation 13) where the temperature, the specific heat capacity, and the thermal conductivity are linked.

Heat transfer behaviour in the system of the pipe sections 321i, 322i, e.g. heat flux from the drilling fluid through the pipe walls, is therefore of relevance for the energy balance in the system and thus also for determining the thermal conductivity and the heat capacity. The measurements of temperature in the apparatus 310 provides the data for determining the heat transfer behaviour and in turn the determination of the heat capacity. The thermal conductivity and the heat capacity can be obtained from heat transfer considerations by numerical methods for example using a finite difference method or a finite volume method or any other method.

Figure 6:
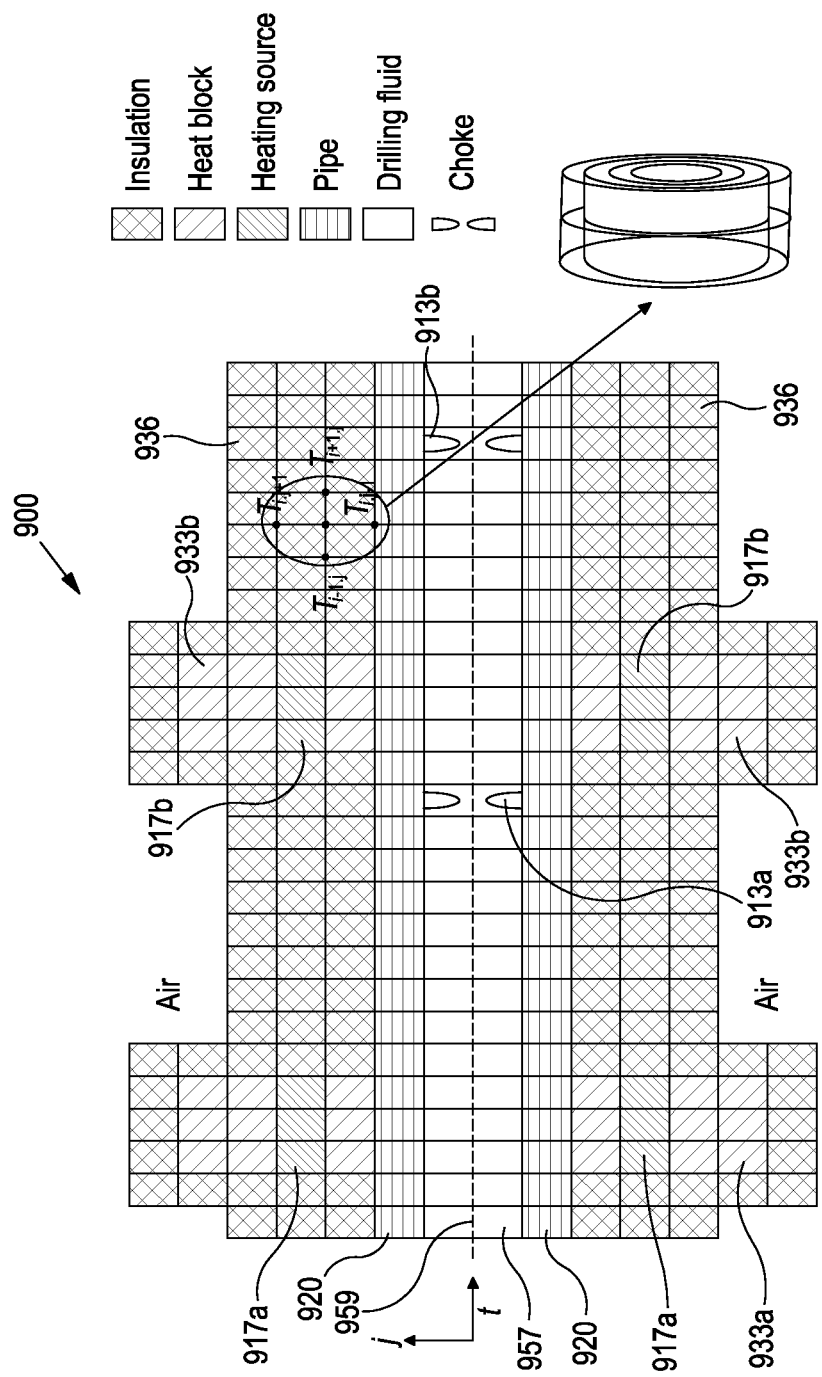
FIG. 6 is a discrete element numerical modelling grid for representing features of the measurement of the apparatus of FIG. 5 for determining thermal conductivity and heat capacity of the drilling fluid.

In the example of using a finite difference method, a discretisation of the system results in the modelling grid 900. The heat transfer discretised grid 900 is depicted generally in FIG. 6. The numerical modelling grid 900 provides sectional representation of parts of the apparatus 310 and pipeline 320 of FIG. 5 for the calculation of the heat capacity and thermal conductivity of the drilling fluid. The grid 900 has a pipe 920 with drilling fluid 957 inside the pipe. The pipe 920 has a longitudinal central axis 959. The direction i is along the longitudinal axis 959 of the pipe. The direction j is orthogonal to the direction i.

The grid 900 further has a first heat block 933a that surrounds the pipe, and a second heat block 933b that surrounds the pipe 920. The second heat block 933b is spaced apart from the first heat block 933a along the pipe. In this way, the first and second heat blocks 9331, 933b represent the two pipe sections 321i, 322i in the apparatus 310. The heat blocks 933a, 933b include respectively the heat sources 917a, 917b which also extend around the pipe 920. The model further has a layer of insulation 936 which is layered around an outside of the pipe 920 and around the heat blocks 933a, 933b. Downstream within the pipe with respect to the first heat block 933a the model 900 includes a choke element 913a, and downstream within the pipe 920 with respect to the second heat block 933b the model 900 includes a choke element 913b. The choke elements 913a, 913b represent the back-pressure valves 313 in the apparatus 310 of FIG. 5.

The boundary conditions are the air temperature, the temperature of the pipe and the drilling fluid at the inlet, the volumetric flow rate at the inlet, the drilling fluid mass density in in situ conditions, the specific heat capacity and the thermal conductivity of the drilling fluid and the heat generated by the heating elements.

Denoting $C_{p_m}$ and $\lambda_m$ respectively the specific heat capacity and the thermal conductivity of the fluid, these two properties need to be estimated. Since $n_T$ temperatures are measured along the pipes 321i, 322i, we can estimate $C_{p_m}$ and $\lambda_m$ by solving the following equation:

$$\arg\min_{C_{p_m}, \lambda_m} \sum_{l=1}^{n_T} (T_l - \tilde{T}_l)^2 \quad (16)$$

where $T_l$ is a measured temperature and $\tilde{T}_l$ is the estimated temperature using the transient heat transfer model. It is possible to solve this minimization problem using different optimization methods including steepest descent methods such as Gauss-Newton or Levenberg Marquart, or more statistical approaches such as particle swarm optimization, etc.

The setup of the apparatus 310 allows both the mass density and the speed of sound in the fluid to be measured at specific conditions of pressure and temperature. From the speed of sound in the drilling fluid mix, it is possible to estimate the adiabatic compressibility. The device also utilizes a heat exchanger from which the thermal conductivity and specific heat capacity of the drilling fluid can be estimated. Combining the specific heat capacity, thermal conductivity and the adiabatic compressibility, the isothermal compressibility can be calculated. By combining measurements made at different conditions of pressure and temperature, a PVT model of the drilling fluid is thus estimated.

Thus, the proposed design of apparatus 310 is capable of providing continuously, in real-time and without delay, a complete PVT behaviour of the drilling fluid as well as its specific heat capacity and thermal conductivity. The model can thus be determined for determining the density of the drilling fluid on a continuous basis for wellbore conditions.

The technique may provide a better estimation of the pressure and temperature dependence of the mass density of drilling fluids, and consequently may allow a more precise estimation of the hydrostatic and hydrodynamic pressures in the wellbore.

Various modifications and improvements may be made without departing from the scope of the invention herein described. The abbreviations and nomenclature used in the description and the various equations above is set out in the following List of Abbreviations and Nomenclature Used Herein. The publications in the List of References provide further information regarding the state of the art.

List of Abbreviations and Nomenclature Used Herein

PVT Pressure Volume Temperature
RMS Root Mean Square
$A_m$ parameter of the drilling fluid PVT model $[ML^{-3}]$(kg/m$^3$)
$B_m$ parameter of the drilling fluid PVT model $[ML^{-3}\vartheta^{-1}]$(kg/(m$^3$K))
$B_w$ parameter of the brine-phase PVT model $[ML^{-3}\vartheta^{-1}]$ (kg/(m$^3$K))
$C_m$ parameter of the drilling fluid PVT model $[L^{-2}T^{-2}]$ (kg/(m$^3$Pa))
$C_p$ isobaric specific heat capacity $[L^2T^{-2}\vartheta^{-1}]$(J/(kg·K))
$C_{p_m}$ specific heat capacity of the drilling fluid $[L^2T^{-2}\vartheta^{-1}k]$(J/(kg·K))
$C_w$ parameter of the brine-phase PVT model $[L^{-2}T^{-2}]$(kg/(m$^3$Pa))
c speed of sound $[LT^{-1}]$(m/s)
$c_1$ speed of sound at conditions of pressure and temperature $(p_1, T_1)$ $[LT^{-1}]$(m/s)
$c_2$ speed of sound at conditions of pressure and temperature $(p_2, T_2)$ $[LT^{-1}]$(m/s)

$c_3$ speed of sound at conditions of pressure and temperature ($p_3$, $T_3$) [LT$^{-1}$](m/s)
$D_m$ parameter of the drilling fluid PVT model [L$^{-2}$T$^{-2}\vartheta^{-1}$](kg/(m$^3$PaK))
$D_w$ parameter of the brine-phase PVT model [L$^{-2}$T$^{-2}\vartheta^{-1}$](kg/(m$^3$PaK))
$E_m$ parameter of the drilling fluid PVT model [L$^{-1}$M$^{-1}$T$^{-4}$](kg/(m$^3$Pa$^2$))
$E_w$ parameter of the brine-phase PVT model [L$^{-1}$M$^{-1}$T$^{-4}$](kg/(m$^3$Pa$^2$))
$F_m$ parameter of the drilling fluid PVT model [L$^{-1}$M$^{-1}$T$^{-4}\vartheta^{-1}$](kg/(m$^3$Pa$^2$K))
$F_w$ parameter of the brine-phase PVT model [L$^{-1}$M$^{-1}$T$^{-4}\vartheta^{-1}$](kg/(m$^3$Pa$^2$K))
$f_i$ volume fraction of the i-component of the drilling fluid [dimensionless]
H enthalpy per unit mass [L$^2$T$^{-2}$](J/kg)
L characteristic length [L](m)
l length [L](m)
m mass of drilling fluid contained in volume V [M](kg)
$N_{u_L}$ Nusselt number [dimensionless]
p absolute pressure [ML$^{-1}$T$^{-2}$](Pa)
Q amount of heat [ML$^2$T$^{-2}$](J)
$\vec{Q}_c$ conductive and natural-convective heat flow [ML$^2$T$^{-3}$](W)
$\vec{Q}_f$ forced convective heat flow [ML$^2$T$^{-3}$](W)
$q_s$ heat source per unit time and per unit length [MLT$^{-3}$] (W/m)
r radial distance [L](m)
$r_l$ difference of measured and estimated temperature at position l [$\vartheta$](K)
S entropy [ML$^2$T$^{-2}\vartheta^{-1}$](J/K)
$S_0$ parameter of the brine density model [ML$^{-3}$](kg/m$^3$)
$S_1$ parameter of the brine density model [ML$^{-3}$](kg/m$^3$)
$S_2$ parameter of the brine density model [ML$^{-3}$](kg/m$^3$)
$S_3$ parameter of the brine density model [ML$^{-3}$](kg/m$^3$)
S curvilinear abscissa [L](m)
T temperature [$\vartheta$](K)
$T_l$ measured temperature [$\vartheta$](K)
$T_l$ estimated temperature [$\vartheta$](K)
$\hat{T}_m$ temperature of the drilling fluid [$\vartheta$](K)
$\vec{v}$ fluid velocity [LT$^{-1}$](m/s)
$w_t$ weight fraction of a salt [dimensionless]

Greek Letters $\alpha$ a volumetric coefficient of thermal expansion [$\vartheta^{-1}$](K$^{-1}$)
$\alpha_{p_1,T_1}$ volumetric coefficient of thermal expansion at conditions of pressure and temperature ($p_1$,$T_1$) [$\vartheta^{-1}$](K$^{-1}$k)
$\alpha_{p_2,T_2}$ volumetric coefficient of thermal expansion at conditions of pressure and temperature ($p_2$, $T_2$) [$\vartheta^{-1}$](K$^{-1}$)
$\alpha_{p_3,T_3}$ volumetric coefficient of thermal expansion at conditions of pressure and temperature ($p_3$, $T_3$) [$\vartheta^{-1}$](K$^{-1}$)
$\Delta r$ length of a radial element [L](m)
$\Delta s$ length of an axial element [L](m)
$\Delta T_a$ axial temperature difference [$\vartheta$](K)
$\Delta T_r$ radial temperature difference [$\vartheta$](K)
$\Delta t$ duration of a time step [T](s)
$\lambda$ thermal conductivity [MLT$^{-3}\vartheta^{-1}$](W/(m·K))
$\lambda_m$ thermal conductivity of the drilling fluid [MLT$^{-3}\vartheta^{-1}$] (W/(m·K))
$\rho_i$ mass density of the i-component of the drilling fluid [ML$^{-3}$](kg/m$^3$)
$\rho_m$ mass density of a drilling fluid [ML$^{-3}$](kg/m$^3$)
$\rho_{m_1}$ mass density measurement at conditions of pressure and temperature ($p_1$, $T_1$) [ML$^{-3}$](kg/m$^3$)
$\rho_{m_2}$ mass density measurement at conditions of pressure and temperature ($p_2$, $T_2$) [ML$^{-3}$](kg/m$^3$
$\rho_{m_3}$ mass density measurement at conditions of pressure and temperature ($p_3$, $T_3$) [ML$^{-3}$](kg/m$^3$)
$\rho_{m_4}$ mass density measurement at conditions of pressure and temperature ($p_4$, $T_4$) [ML$^{-3}$](kg/m$^3$)
$\rho_{m_5}$ mass density measurement at conditions of pressure and temperature ($p_5$, $T_5$) [ML$^{-3}$](kg/m$^3$)
$\rho_{m_6}$ mass density measurement at conditions of pressure and temperature ($p_6$, $T_6$) [ML$^{-3}$](kg/m$^3$)
$\rho_s$ mass density of a solid material [ML$^{-3}$](kg/m$^3$)
$\rho_w$ mass density of a brine [ML$^{-3}$](kg/m$^3$)
$\kappa_T$ isothermal compressibility coefficient [M$^1$LT$^2$](Pa$^{-1}$)
$\kappa_{p_1,T_1}$ isothermal compressibility coefficient at conditions of pressure and temperature ($p_1$, $T_1$) [M$^{-1}$LT$^2$](Pa$^{-1}$)
$\kappa_{p_2,T_2}$ isothermal compressibility coefficient at conditions of pressure and temperature ($p_2$, $T_2$) [M$^{-1}$LT$^2$](Pa$^{-1}$)
$\kappa_{p_3,T_3}$ isothermal compressibility coefficient at conditions of pressure and temperature ($p_3$, $T_3$) [M$^{-1}$LT$^2$](Pa$^{-1}$)
$\kappa_S$ isentropic compressibility [M$^{-1}$LT$^2$](Pa$^{-1}$)
$\Omega$ a set of indices for the components of the drilling fluid

LIST OF REFERENCES

[1] API, "API RP 13D: Recommended Practice for Rheology and Hydraulics of Oil-well Drilling Fluids," American Petroleum Institute, 2017.

[2] Barletta, A. 1997. Fully developed laminar forced convection in circular ducts for power-law fluids with viscous dissipation. *Int. J. Heat Mass Transfer*, 40 (1): 15-26. https://doi.org/10.1016/S0017-9310(96)00094-4

[3] Cayeux, E., Mesagan, T., Tanripada, S., Zidan, M., Fjelde, K. K., 2014. Real-time Evaluation of Hole Cleaning Conditions Using a Transient Cuttings Transport Model. *SPE Drilling & Completion*, 29 (1): 5-21. SPE-163492-PA. https://doi.org/10.2118/166801-PA

[4] Cayeux, E. (2020). Mathematical Modelling of the Drilling Process for Real-time Applications in Drilling Simulation, Interpretation and Assistance. Doctoral thesis 506, University of Stavanger. ISBN 978-82-7644-913-6

[5] Crank, J., Nicolson, P., 1947. A practical method for numerical evaluation of solutions of partial differential equations of the heat conduction type. *Proc. Cam. Phil. Soc.*, 43 (1): 50-67. Doi:10.1017/S0305004100023197

[6] Corre, B., Eymard, R., Guenot, A., 1984. Numerical Computation of Temperature Distribution in a Wellbore While Drilling. Paper SPE-13208-MS presented at the SPE Annual Technical Conference in Houston, Texas, USA, Sep 16-19. https://doi.org/10.2118/13208-MS

[7] Isambourg, P., Bertin, D., Brangetto, M., 1999. Field Hydraulic Tests Improve HPHT Drilling Safety and Performance. Paper SPE-49115-MS presented at the SPE Annual Technical Conference, New Orleans, Louisiana, USA, 27-30 Sep. https:/doi.org/10.2118/49115-MS

[8] Kemp, N. P., Thomas, D. C., Atkinson G., Atkinson, B. 1989. Density Modelling of Brines as a Function of Composition Pressure and Temperature. *SPE Production Engineering*, 4 (4): 394-400. SPE-16079-PA. https://doi.org/10.2118/16079-PA

[9] Landau, L. D., Lifshitz, E. M., 1980. Course of Theoretical Physics, vol 5, Statistical Physics. Butterworth Heinemann, Elsevier, ISBN 78-0-7506-3372-7

[10] Press, W. H., Teukolsky, S. A., Vetterling, W. T., Flannery, B. P., 1995. Numerical Recipes in C. Cambridge University Press, ISBN 0 521 43108 5.

[11] Zamora, M., Roy, S., Slater, K., Troncoso, J., 2013. Study on the Volumetric Behavior of Base Oils, Brines, and Drilling Fluids Under Extreme Temperatures and Pressures. SPE *Drilling & Completion,* 28 (3): 278-288. https://doi.org/10.2118/160029-PA

The invention claimed is:

1. A method of determining at least one property of a wellbore fluid system, the method comprising:
   providing measurement apparatus including at least one pipe section;
   communicating a drilling fluid through the pipe section;
   measuring at least one density which is associated with at least one condition of pressure and temperature of the drilling fluid in the pipe section;
   measuring at least one speed of sound of the drilling fluid in the pipe section;
   providing or estimating at least one heat capacity of the drilling fluid;
   providing a model of density of the drilling fluid related to pressure and temperature;
   determining coefficients of the model using the measured density of the drilling fluid, the speed of sound of the drilling fluid, and the heat capacity of the drilling fluid; and
   using the model with determined coefficients to determine the property of the wellbore fluid system.

2. The method as claimed in claim 1, further comprising obtaining the adiabatic compressibility or the isothermal compressibility of the drilling fluid using any of: the measured speed of sound, the heat capacity of the drilling fluid, and the model.

3. The method as claimed in claim 1, further comprising obtaining measurements of density at different conditions of pressure and temperature of the drilling fluid in the pipe section.

4. The method as claimed in claim 3, further comprising using the measurements of density at different conditions of pressure and temperature of the drilling fluid in the pipe section to determine the coefficients of the model.

5. The method as claimed in claim 3, further comprising operating the measurement apparatus to provide or control the conditions of pressure and temperature of the drilling fluid.

6. The method as claimed in claim 1, further comprising:
   measuring, or providing, or obtaining measurements at different conditions of temperature and pressure of any one or more of:
   the speed of sound of the drilling fluid in the pipe section,
   the heat capacity of the drilling fluid in the pipe section,
   the adiabatic compressibility of the drilling fluid in the pipe section, and
   the isothermal compressibility of the drilling fluid in the pipe section; and
   using the model, and any one or more of the speed of sound, the heat capacity, and the isothermal compressibility, to determine the property of the wellbore fluid system.

7. The method as claimed in claim 1, further comprising any one or more of:
   providing a heat exchanger, transferring heat to or from the drilling fluid in the pipe section,
   obtaining temperature measurements at different locations along the pipe section downstream from the heat exchanger, obtaining a temperature development of the drilling fluid along the pipe section, and/or
   estimating either or both the heat capacity and the thermal conductivity of the drilling fluid using the temperature measurements.

8. The method as claimed in claim 1, wherein the property of the wellbore fluid system to be determined may comprise any of: a pressure in the wellbore, a density of the drilling fluid in the wellbore, a density related property, a rheological property, a property for controlling a drilling system, a property for use in a managed pressure drilling system, a property of the drilling fluid in the wellbore, and/or a property of the drilling fluid in wellbore conditions of temperature and pressure.

9. An apparatus for determining at least one property of a wellbore fluid system, the apparatus comprising:
   at least one pipe section for communicating drilling fluid through the pipe section,
   at least one densitometer for obtaining density data at different conditions of pressure and temperature of the drilling fluid in the pipe section,
   at least one speed of sound unit for obtaining speed of sound data at different conditions of pressure and temperature of the drilling fluid in the pipe section, and
   processing means for processing the obtained density data, and the obtained speed of sound data, and heat capacity of the drilling fluid to determine coefficients of a model of density related to pressure and temperature,
   the processing means being operable to determine the property of the wellbore fluid system based on the model with determined coefficients.

10. The apparatus as claimed in claim 9, further comprising one or more components for controlling conditions of pressure and temperature of the drilling fluid in the pipe section, the one or more components being selected from any of: at least one heat transfer device for changing or determining the temperature of the drilling fluid in the pipe section, at least one back pressure device for changing or determining the pressure of the drilling fluid, and at least one pump for pumping the drilling fluid through and/or along the pipe section.

11. The apparatus as claimed in claim 9, further comprising, in proximity to the drilling fluid in the pipe section, any one or more of: at least one temperature sensor, at least one pressure sensor, and/or at least one flow meter.

12. The apparatus as claimed in claim 9, further comprising pipe sections arranged to communicate drilling fluid in parallel through at least one pair of pipe sections wherein the one pipe section of the pipe sections is configurable to have different condition of pressure and temperature than the other pipe section of the pipe sections.

13. The apparatus as claimed in claim 9, further comprising pipe sections in series, one or more of the pipe sections have different conditions of pressure and temperature than one or more others of the pipe sections.

14. The apparatus as claimed in claim 9, wherein the at least one pipe section is provided with:
   at least one heater device for heating the drilling fluid in the pipe section,
   temperature sensing means for obtaining measurements of temperature of the drilling fluid from several locations along the pipe section at a location downstream of heater device for determining a development or evolution of temperature of the drilling fluid along the pipe section,
   at least one densitometer,
   at least one speed of sound device,
   at least one flow meter,
   at least one pressure senso,; and
   at least one back pressure device.

15. The apparatus as claimed in claim 9, wherein the pipe section comprises a layer of insulation around the pipe section along part of its length.

16. A wellbore drilling system including an apparatus, wherein the apparatus further comprises:
- at least one pipe section for communicating drilling fluid through the pipe section,
- at least one densitometer for obtaining density data at different conditions of pressure and temperature of the drilling fluid in the pipe section,
- at least one speed of sound unit for obtaining speed of sound data at different conditions of pressure and temperature of the drilling fluid in the pipe section, and
- processing means for processing the obtained density data, and the obtained speed of sound data, and heat capacity of the drilling fluid to determine coefficients of a model of density related to pressure and temperature,
- the processing means being operable to determine a property of the wellbore drilling system based on the model with determined coefficients.

17. The wellbore drilling system as claimed in claim 16, wherein the pipe section is a section of a drilling fluid circulation path in communication with the wellbore for circulating the wellbore into or out of the well through the pipe section.

* * * * *